United States Patent [19]

Ishii

[11] Patent Number: 4,616,733

[45] Date of Patent: Oct. 14, 1986

[54] METHOD AND APPARATUS FOR REDUCING GEAR BACKLASH IMPACTS IN AN ELEVATOR SYSTEM

[75] Inventor: Toshiaki Ishii, Inazawa, Japan

[73] Assignee: Mitsubishi Denki Kabushiki Kaisha, Tokyo, Japan

[21] Appl. No.: 674,632

[22] Filed: Nov. 26, 1984

[30] Foreign Application Priority Data

Dec. 13, 1983 [JP] Japan ............................... 58-234882
Dec. 16, 1983 [JP] Japan ............................... 58-237343

[51] Int. Cl.$^4$ ............................................... B66B 5/00
[52] U.S. Cl. ................................................. 187/29 R
[58] Field of Search ........................................... 187/29

[56] References Cited

U.S. PATENT DOCUMENTS

| | | | |
|---|---|---|---|
| 2,653,291 | 9/1953 | Rice et al. ........................... | 187/29 R |
| 4,030,570 | 6/1977 | Caputo ............................... | 187/29 R |
| 4,269,286 | 5/1981 | Ishii et al. ........................... | 187/29 R |
| 4,271,931 | 6/1981 | Watanabe ........................... | 187/29 R |
| 4,475,631 | 10/1984 | Nomura ............................. | 187/29 R |

Primary Examiner—William M. Shoop, Jr.
Assistant Examiner—W. E. Duncanson, Jr.
Attorney, Agent, or Firm—Sughrue, Mion, Zinn, Macpeak and Seas

[57] ABSTRACT

Collision impacts between meshing gears in a speed reduction mechanism 11 of an elevator system due to backlash during transitions between power/driving and regenerative/driven modes of operation are reduced by detecting the actual or approaching separation of the gear teeth, and in response thereto temporarily reducing the motor torque to correspondingly reduce the equalized relative speed difference between the input and output shafts of the mechanism. Tooth separation may be detected by sensing a difference in amplitude between signals proportional to the input and output shaft speeds, equalized in accordance with the gear ratio, or by sensing a polarity change in the motor drive current. The motor torque may be reduced by the relay controlled switching of resistors 40, 43 in a speed controller to thereby convert the function of an operational amplifier 45 therein from a first order time lag circuit to an integrator.

17 Claims, 20 Drawing Figures

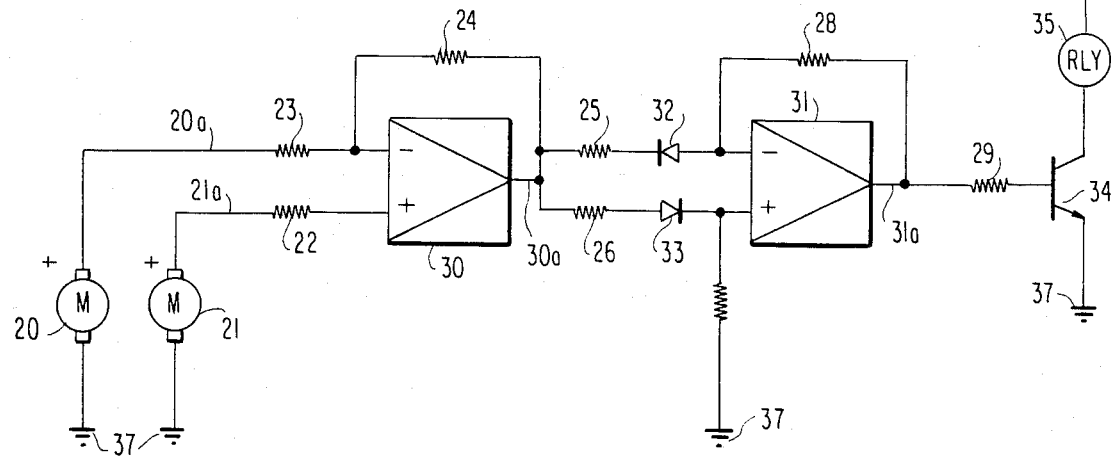
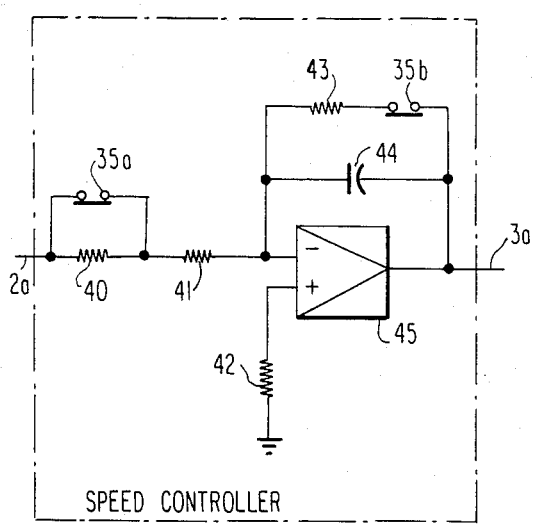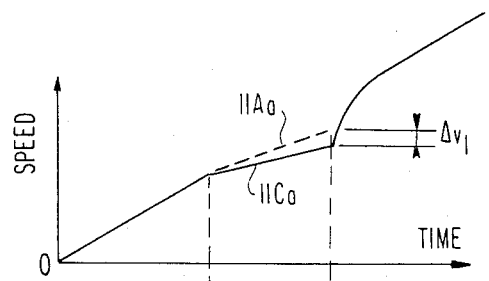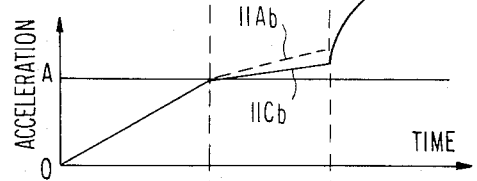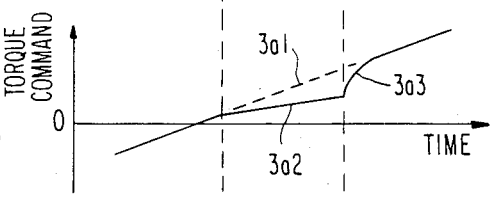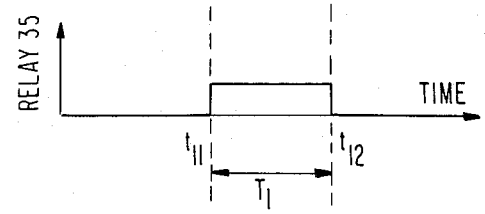

METHOD AND APPARATUS FOR REDUCING GEAR BACKLASH IMPACTS IN AN ELEVATOR SYSTEM

BACKGROUND OF THE INVENTION

This invention relates to a control method and apparatus for an elevator system with a cage driven by a motor, and more particularly to a control mechanism for preventing an elevator cage from vibrating.

U.S. Pat. No. 4,030,570 discloses an apparatus for accurately controlling the speed of an elevator drive motor by means of speed and current feedback circuits.

Although worm gears are generally used as reduction gears for elevator hoisting apparatuses, they not only have a low power transmission efficiency but also tend to needlessly consume power. As a result, the more recent trend is to use parallel axis speed reducers having helically cut gears.

Referring to FIGS. 1 through 4, a conventional elevator speed control apparatus using parallel axis reduction gears will be described. The block diagram arrangement of FIG. 1 comprises a speed command generator 1 for generating a speed command signal 1a, an adder 2 for generating an error or deviation signal 2a by collating the speed command signal 1a with an actual speed feedback signal 10a, a speed controller 3 for generating a torque command signal 3a by, inter alia, amplifying the output of the adder 2, an adder 4 for generating a deviation signal by collating the torque command signal 3a with a current feedback signal 9a, a torque controller 5 for generating an ignition signal 5a corresponding to the output of the adder 4, a thyristor converter 6 for generating a d.c. variable voltage output based on a firing angle controlled by the ignition signal 5a and comprising a pair of three-phase, full-wave, forward/inverse rectifying circuits formed by thyristors, an armature 7 of a d.c. motor controlled by the converter, a shunt field system 8 for the motor, an armature current detector 9 for generating the current feedback signal which is proportional to the motor torque, a tachometer generator 10 for generating the speed feedback signal, a speed reducer 11, an input shaft 11A formed by extending the shaft of the motor, a drive sheave 12 fixed to an output shaft 11I of the speed reducer, a main cable 13 wound on the sheave, a cage 14 coupled to one end of the cable, and a counterweight 15 coupled to the other end of the cable. The operation of the FIG. 1 system is fully conventional if not self-evident and will not be described in detail.

The sectional view of the speed reducer in FIG. 2 shows a first helical gear 11B fixed to the input shaft 11A, a parallel intermediate shaft 11C mounting a second helical gear 11D meshing with the gear 11B and a third helical gear 11E, a parallel intermediate shaft 11F mounting a fourth helical gear 11G meshing with the gear 11E and a fifth helical gear 11H, and a parallel output shaft 11I carrying a sixth helical gear 11J meshing with the gear 11F.

FIG. 3(a) shows a waveform of the speed signal 10a during the upward operation of the cage 14 without load; FIG. 3(b) a waveform of the corresponding cage acceleration; and FIG. 3(c) a waveform of the corresponding torque command signal 3a.

$S_1$ of FIG. 3(c) represents a region wherein the motor armature 7 is power running and $S_2$ regions wherein the armature is regeneratively running or braking. The motor torque is switched from regeneration to powering at time $t_1$ and from powering to regeneration at time $t_2$. At these times the engagement of the helical gears with one another in the speed reducer 11 is changed because of backlash. Consequently, the impacts shown by the arrows in FIG. 3(b) are transmitted to the cage 14 and impair the riding comfort of the passengers.

FIG. 4 shows enlarged versions of the regions at time $t_1$ of FIG. 3, with FIG. 4(a) illustrating the speed of revolution 11Aa of the input shaft converted into that of the intermediate shaft 11C, and the speed of revolution 11Ca of the intermediate shaft; FIG. 4(b) showing the acceleration 11Ab of the input shaft, the acceleration 11Cb of the intermediate shaft, and thus the acceleration of the unloaded cage 14 when it moves upwards upon release of its friction brake due to the pull of the counterweight; FIG. 4(c) showing the waveforms of the torque command signal 3a and the motor torque T; FIG. 4(d) showing a changing engagement between the helical gears 11B and 11D during which the tooth 11Ba of the gear 11B is disengaged from the tooth 11Da of the gear 11D and contacts the next tooth 11Db.

Assuming that the cage 14 is at rest without load and starts to move upwardly, the tooth 11Ba of the helical gear 11B remains in contact with the tooth 11Da of the helical gear 11D up to time $t_{11}$. Positive motor torque T is generated at this time, and when the acceleration of the input shaft 11A exceeds the acceleration of the intermediate shaft 11C the tooth 11Ba separates from the tooth 11Da. As a result, the speed of revolution 11Ca and the acceleration 11Cb of the intermediate shaft drop off. When the tooth 11Ba subsequently engages the tooth 11Db, the collision energy is determined by the relative speed difference $\Delta v$ between the helical gears 11B and 11D, and when this difference is large the collision impact generates abnormal vibrations which impair passenger comfort.

These collision impacts are obviously compounded by the other helical gear pairs 11E, 11G and 11H, 11J, though reference has only been made to the gears 11B and 11D.

SUMMARY OF THE INVENTION

An object of the present invention is to provide a control method and apparatus for an elevator system which achieves greatly improved ride comfort by buffering impacts caused by the backlashes of the gears and thus prevents these shocks from being applied to the elevator cage.

To accomplish this object the arrangement according to the invention detects the point at which the engagement of the gear teeth is changed due to backlash in the speed reducer, and in response thereto reduces the timing variations for the torque command signal to the motor and thus the relative speed difference or $\Delta v$ between gears in the speed reducer when they collide to thereby buffer impacts.

BRIEF DESCRIPTION OF THE DRAWINGS

FIG. 6 is a circuit diagram of FIG. 5.

FIG. 7 is a circuit diagram of a speed controller used in the invention.

FIGS. 8(a)–8(d) are graphical representations illustrative of the operation of FIGS. 5–7.

DETAILED DESCRIPTION OF THE PREFERRED EMBODIMENTS

Referring to the embodiment of FIGS. 5–8, for brevity it is assumed that the helical gear 11B fixed to an input shaft 11A directly engages the helical gear 11J fixed to the output shaft 11I in a speed reducer 11.

Figure 5:
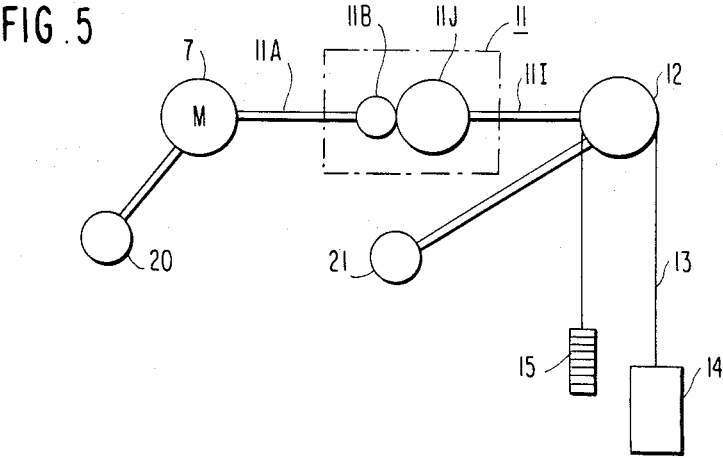
FIG. 5 is a simplified diagram of a control apparatus for an elevator system according to the present invention illustrating its essential components.

FIGS. 5 and 6 show a control apparatus including a speed detector 20 for producing an output 20a corresponding to the speed of revolution of the input shaft 11A, a speed detector 21 for producing an output 21a corresponding to the speed of revolution of the sheave 12 or output shaft 11I, resistors 22–29, operational amplifiers 30, 31, diodes 32, 33, a transistor 34, a speed difference detection relay 35 formed with a mercury contact relay (contacts will be shown in FIG. 7), a positive power supply 36, and a negative power supply 37. The operational amplifier 30 and the resistors 22–24 function as, inter alia, a comparator, and the operational amplifier 31, the resistors 25–28 and the diodes 32, 33 function as, inter alia, an absolute value circuit.

FIG. 7 shows a speed controller including normally closed contacts 35a, 35b of the speed detection relay 35, resistors 40–43, a capacitor 44 and an operational amplifier 45.

Figure 1:
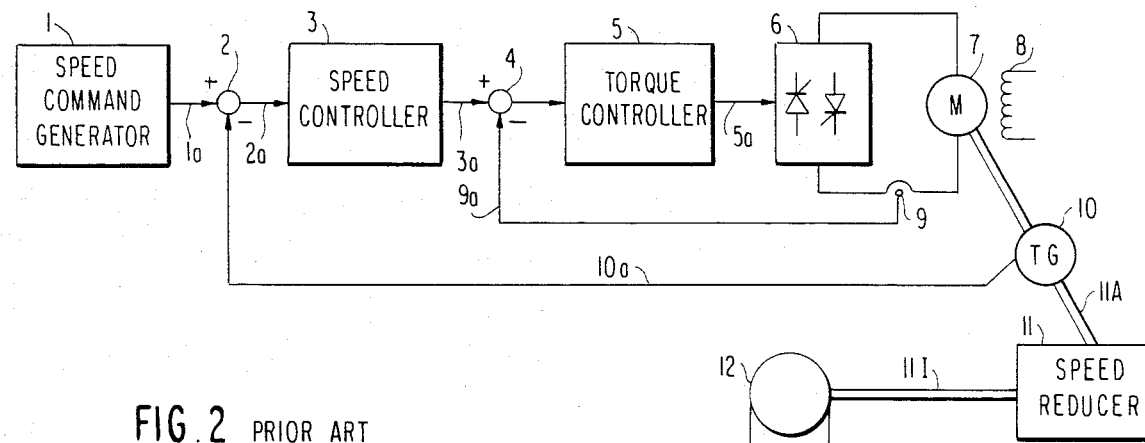
FIG. 1 is a block diagram of a conventional control apparatus for an elevator system.
Figure 2:
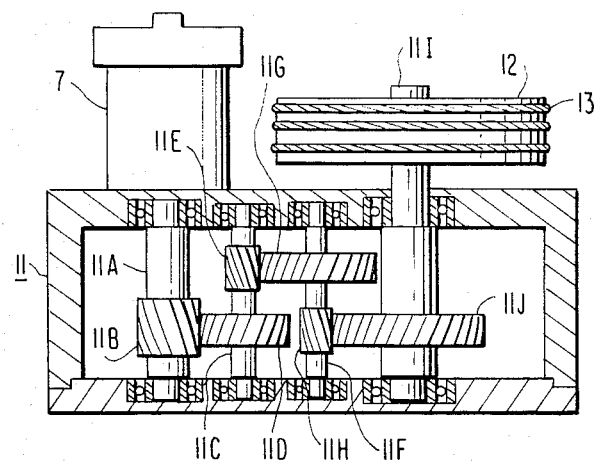
FIG. 2 is a transverse sectional view of the speed reducer of FIG. 1.
Figure 3A:
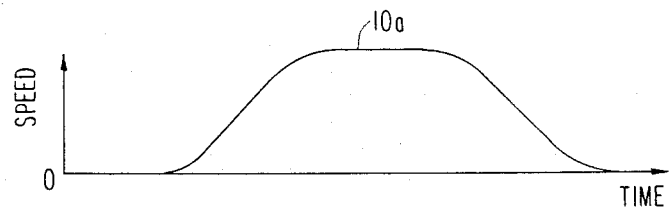
FIGS. 3(a)–3(c) are graphical representations explanatory of the operation of the control apparatus of FIG. 1.
Figure 3B:
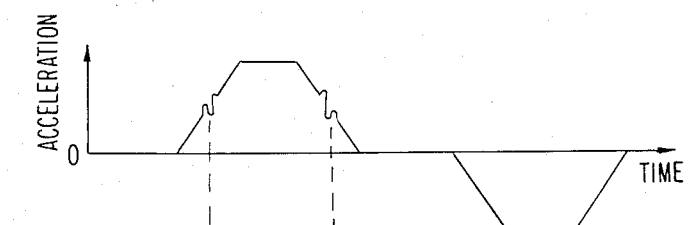
Figure 3C:
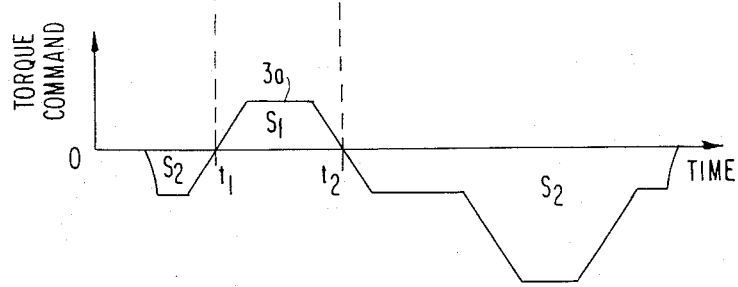
Figure 4A:
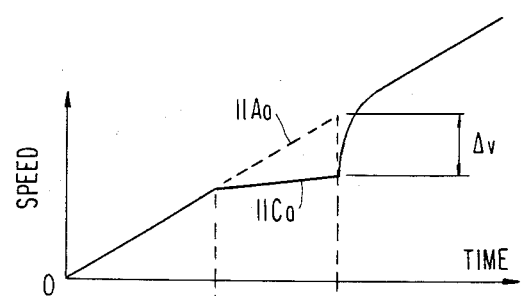
FIGS. 4(a)–4(d) are graphical representations explanatory of the details of FIG. 3.
Figure 4B:
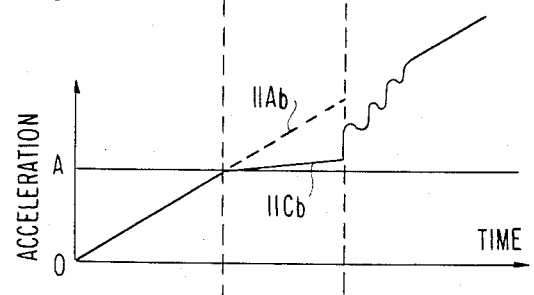
Figure 4C:
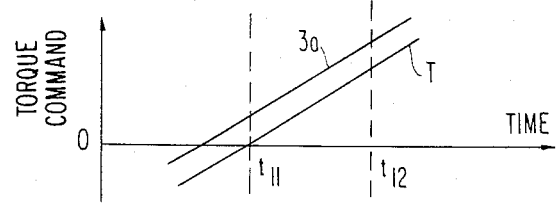
Figure 4D:
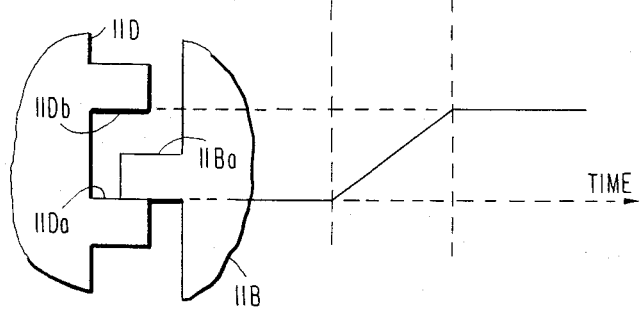

In operation, the speed detectors 20, 21 produce the outputs 20a, 21a corresponding to the speed of revolution of the input shaft 11A and that of the output shaft 11I, respectively. The resistances $R_{22}$, $R_{23}$ of the resistors 22, 23 are selected such that:

$$R_{23}/R_{22} = k,$$

where k: speed reduction rate of helical gears 11B, 11J. While the teeth of the gears 11B, 11J contact each other as shown in FIG. 4(d), the two resistively proportioned inputs to the operational amplifier 30 will be equal and the output 30a of the amplifier will be zero. As mentioned above, however, the speed of the input shaft 11A relative to that of the output shaft 11I changes when the teeth of the helical gears 11B, 11J separate from each other, and a difference will occur between the two inputs to the operational amplifier 30 and its output 30a will indicate a positive or negative value. In other words, the resistors 22, 23 constitute a level conversion circuit for matching the levels of the outputs 20a, 21a.

The output 31a of the operational amplifier 31 never indicates a negative value due to the diodes 32, 33 at its inputs, irrespective of the polarity of the output 30a.

When the teeth of the gears 11B, 11J are engaged with each other and the output 30a of the amplifier 30 is zero, the output 31a of the operational amplifier 31 is also zero and the transistor 34 remains non-conductive.

The contacts 35a, 35b (FIG. 7) are closed since the speed difference detection relay 35 is deenergized. Under these conditions the operational amplifier 45 operates as a time lag circuit of the first order, and the deviation signal 2a is amplified to become the torque command signal 3a.

When the teeth of the gears 11B, 11J subsequently separate and thereby change the relative speed of the input and output shafts 11A, 11I, making the output 30a value of the operational amplifier 30 positive or negative, the output 31a of the operational amplifier 31 becomes positive and renders the transistor 34 conductive. The speed difference detection relay 35 is thus energized and opens its contact 35b so that the operational amplifier 45 now functions as an integrator. At the same time the contact 35a is opened, whereby the resistor 40 is inserted and the torque command signal 3a changes in accordance with the ratio between the resistances 40, 43.

The aforementioned operation may be seen in FIG. 8, wherein the speed difference detection relay 35 is assumed energized at $t_{11}$ and deenergized at $t_{12}$. The initial torque command signal is represented by 3a1, and another by 3a2 when the speed difference detection relay 35 is energized as the contacts 35a, 35b open. The slope of the torque command signal 3a2 can be varied by the resistor 40. The torque command 3a3 is a smooth reset signal after the relay 35 is deenergized at $t_{12}$.

When the separation of the teeth of the gears 11B, 11J is thus detected, the torque command signal 3a2 is produced and the acceleration 11Ab of the motor armature and input shaft 11A is reduced. Accordingly, the relative speed $\Delta v_1$ of the input shaft 11A to that of the output shaft 11I is sharply reduced in comparison with that of FIG. 4, and the backlash impact caused by the re-contact of the teeth of the gear 11B with those of the gear 11J decreases, thus improving the ride comfort.

Figure 9:
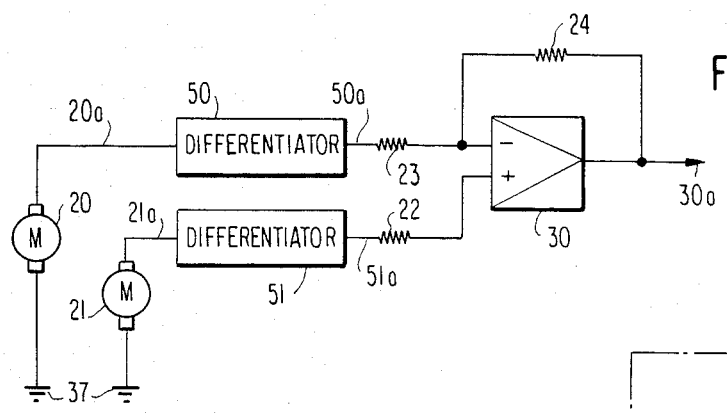
FIG. 9 is a circuit diagram of another embodiment of the invention corresponding to FIG. 6.
Figure 10:
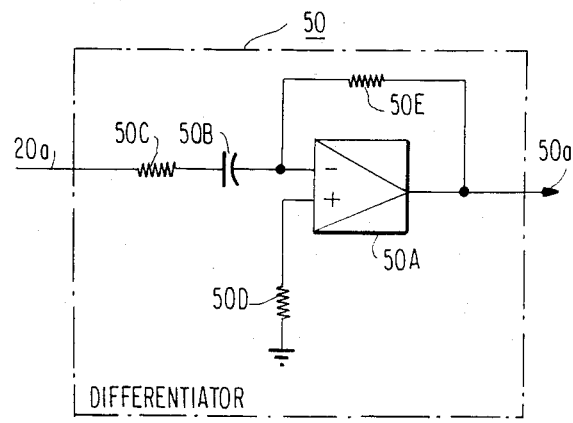
FIG. 10 is a circuit diagram of the differentiator of FIG. 9.

FIGS. 9 and 10 show a modification of the invention, wherein the outputs 20a, 21a of the speed difference detectors 20, 21 are fed through differentiators 50, 51 to produce acceleration signals 50a, 51a. The remaining functions correspond to those described above. As shown in FIG. 10, the differentiator 50 (and 51) comprises an operational amplifier 50A, a capacitor 50B and resistors 50C–50E.

Figure 11:
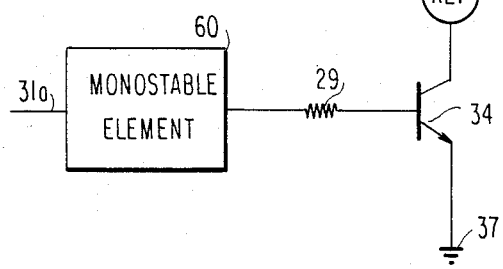
FIG. 11 is a circuit diagram of still another embodiment of the invention corresponding to FIG. 6.

FIG. 11 shows still another modification, wherein a monostable element 60 (for instance, SN74LSI23N of Texas Instrument) whose output will remain high for a certain time if the input thereto becomes high is inserted between the operational amplifier 31 and the resistor 29.

Although reference has been made to the use of d.c. motors in the above examples, a.c. induction motors may also be used.

Figure 12:
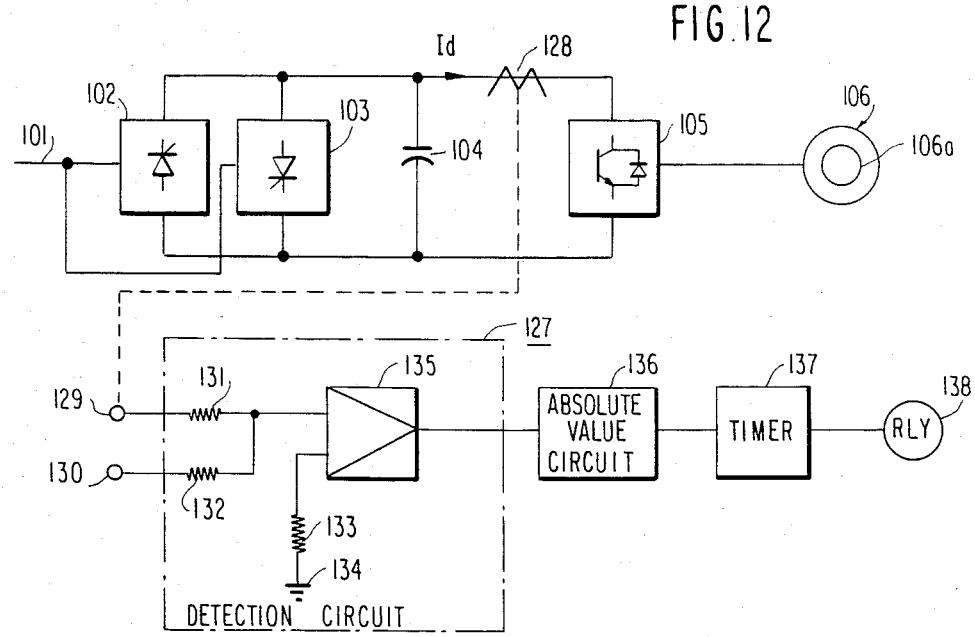
FIG. 12 is a block diagram of a further embodiment of the invention.

FIG. 12 is a block diagram illustrating a further embodiment of the invention wherein a powering converter 102 and a regenerative converter 103 are connected to a feeder 101 of the threephase a.c. power supply in parallel, a smoothing condenser 104 and a transistor inverter 105 are connected across the output terminals of the converters in parallel, and an induction motor 106 is connected to the inverter 105. A detection circuit 127 detects the direction in which the d.c. current Id flows between the converters and the inverter, such detection circuit having an input terminal for receiving a signal from a d.c. current detector 128, an input terminal 130 for receiving a bias signal as described later, resistors 131, 132 connected to the input terminals, and a comparator element 135 having an input terminal for receiving a signal through the resistors 131 or 132 and another inupt terminal connected to ground through a resistor 133. The detection circuit 127 generates an output when the d.c. current Id changes its direction of flow from positive to negative or vice versa (to be more precise, when it represents a specific positive or negative value close to zero). The circuitry also includes an absolute value circuit 136, a timer 137 such as a msmv for outputting a drive signal for a predetermined time in response to an output from the absolute value circuit, and a mercury contact relay 138 energized by the output of the timer 137. The relay 138 controls the normally closed contacts 35a and 35b in the speed controller of FIG. 7.

The changes in the speed, acceleration and torque command in this embodiment are the same as those shown in FIGS. 8(a), 8(b) and 8(c), as are the changes in the excitation of the relay 138.

When the operating mode is changed from power to regenerative running the d.c. current Id changes its direction of flow as it crosses the zero point and the current direction detecting circuit 127 detects such change and produces an output which triggers the timer 137 through the absolute value circuit 136. The timer produces an output for a predetermined time $T_1$ roughly equal to that required for the teeth of the gears 11B, 11J to break and reestablish contact with each other, which energizes the relay 138 for a time $T_1$ as shown in FIG. 8(d). This opens the contacts 35a and 35b in FIG. 7, which attendantly reduces the torque command, acceleration and speed difference between the input and output shafts to thereby minimize the collision impact upon gear teeth reengagement as described above.

In addition to varying the slope of the torque command signal 3a2 by changing the value of the resistance 40 as described earlier, the bias signal applied to terminal 130 in FIG. 12 may also be changed to vary the time at which the relay 138 is excited. For instance, this bias signal may be set to provide a desired degree of "advance triggering" as the current Id approaches zero to thereby compensate for the usual inductive and switching delays in the circuitry.

What is claimed is:

1. In an elevator system including a drive motor (7), a sheave (12) carrying a cable (13) having an elevator cage (15) suspended from one end and a counterweight (14) suspended from another end, and a speed reduction mechanism (11) comprising a first helical gear (11B) fixed to an output shaft (11A) of the motor and a second helical gear (11J) fixed to an input shaft (11I) of the sheave and operatively meshing with the first gear, a method for reducing collision impacts due to backlash during transitions between power/driving and regenerative/driven modes of operation, comprising the steps of:
    (a) detecting a separation between teeth of the first and second gears, and
    (b) reducing the torque applied to the output shaft by the motor in response to the separation detection to attendantly reduce a relative speed difference between the output and input shafts and thereby soften collision impacts upon the re-engagement of the gear teeth.

2. A method according to claim 1, wherein the separation detection is implemented by:
    (a) generating first and second signals proportional to the respective rotational speeds of the input and output shafts,
    (b) attenuating said signals in proportion to a gear ratio of the speed reduction mechanism to produce third and fourth signals of equal amplitude when the input and output shafts are rotating at the same speed, and
    (c) sensing a difference in amplitude between said third and fourth signals.

3. A method according to claim 1, wherein the separation detection is implemented by sensing a change in the polarity of a current applied to the motor.

4. In an elevator system including a drive motor (7), a sheave (12) carrying a cable (13) having an elevator cage (15) suspended from one end and a counterweight (14) suspended from another end, and a speed reduction mechanism (11) comprising a first helical gear (11B) fixed to an output shaft (11A) of the motor and a second helical gear (11J) fixed to an input shaft (11I) of the sheave and operatively meshing with the first gear, an apparatus for reducing collision impacts due to backlash during transitions between power/driving and regenerative/driven modes of operation, comprising:
    (a) means for detecting a separation between teeth of the first and second gears, and
    (b) means for reducing the torque applied to the output shaft by the motor in response to the separation detection to attendantly reduce a relative speed difference between the output and input shafts and thereby soften collision impacts upon the re-engagement of the gear teeth.

5. An apparatus according to claim 4, wherein the separation detection means comprises:
    (a) means (20, 21) for generating first and second signals proportional to the respective rotational speeds of the input and output shafts,
    (b) means (22, 23) for attenuating said signals in proportion to a gear ratio of the speed reduction mechanism to produce third and fourth signals of equal amplitude when the input and output shafts are rotating at the same speed, and
    (c) means (30) for sensing a difference in amplitude between said third an fourth signals.

6. An apparatus according to claim 4, wherein the separation detection means comprises means for sensing a change in the polarity of a current applied to the motor.

7. An apparatus according to claim 4, wherein said speed reduction mechanism comprises a plurality of parallel axis shafts including said input and output shafts, and a plurality of helical gears fixed respectively to the shafts, including the first and second gears, and directly meshing with one another in pairs.

8. An apparatus according to claim 4, wherein the torque reducing means comprises:
    (a) an operational amplifier (45) for generating an output torque command signal (3a),
    (b) means coupling a speed deviation signal (2a) to an input of the amplifier,
    (c) impedance means (40, 43) connected in series and in parallel with the amplifier, and
    (d) relay switch means (35a, 35b) operatively connected with the impedance means for converting the operational mode of the amplifier from a first order time lag circuit to an integrator.

9. An apparatus according to claim 5, wherein the torque reducing means comprises:

(a) an operational amplifier (45) for generating an output torque command signal (3a),
(b) means coupling a speed deviation signal (2a) to an input of the amplifier,
(c) impedance means (40, 43) connected in series and in parallel with the amplifier, and
(d) relay switch means (35a, 35b) operatively connected with the impedance means for converting the operational mode of the amplifier from a first order time lag circuit to an integrator.

10. An apparatus according to claim 6, wherein the torque reducing means comprises:
(a) an operational amplifier (45) for generating an output torque command signal (3a),
(b) means coupling a speed deviation signal (2a) to an input of the amplifier,
(c) impedance means (40, 43) connected in series and in parallel with the amplifier, and
(d) relay switch means (35a, 35b) operatively connected with the impedance means for converting the operational mode of the amplifier from a first order time lag circuit to an integrator.

11. An apparatus according to claim 9, wherein:
(a) the attenuating means comprises resistors (22, 23) weighted in proportion to the gear ratio, and
(b) the sensing means comprises a comparator (30), and further comprising:
(c) an absolute value circuit (31) connected to an output of the comparator via oppositely polarized diodes (32, 33), and
(d) a relay (35) energized by an output of the absolute value circuit for controlling the switch means.

12. An apparatus according to claim 11, further comprising a monostable element (60) connected between the absolute value circuit and the relay.

13. An apparatus according to claim 5, further comprising differentiating means (50, 51) connected between the generating means and the attenuating means.

14. An apparatus according to claim 5, wherein the motor is an a.c. induction motor (106), said elevator system further comprises a converter (102, 103) for converting an a.c. input current into a d.c. output current, a smoothing condenser (104) connected across an output of the converter, and an inverter connected to the converter output for converting the d.c. output current thereof into an a.c. output current for the motor, and wherein the sensing means is coupled to the converter output.

15. An apparatus according to claim 14, wherein the sensing means comprises:
(a) a current detector (128),
(b) a comparator (135) having a first input connected to an output of the current detector and a second input connected to ground,
(c) an absolute value circuit (136) connected to an output of the comparator, and
(d) a relay (138) energized by an output of the absolute value circuit.

16. An apparatus according to claim 15, further comprising means (130) for applying a biasing signal to the first comparator input to enable the detection of an approaching separation between the gear teeth.

17. An apparatus according to claim 15, wherein the torque reducing means comprises:
(a) an operational amplifier (45) for generating an output torque command signal (3a),
(b) means coupling a speed deviation signal (2a) to an input of the amplifier,
(c) impedance means (40, 43) connected in series and in parallel with the amplifier, and
(d) relay switch means (35a, 35b) operatively connected with the impedance means for converting the operational mode of the amplifier from a first order time lag circuit to an integrator, said switch means being controlled by said relay.

* * * * *